(12) United States Patent
Joyce et al.

(10) Patent No.: US 11,172,375 B2
(45) Date of Patent: Nov. 9, 2021

(54) METHOD FOR DETERMINING DEPLOYMENT PARAMETERS OF CUSTOMER PREMISES EQUIPMENT

(71) Applicant: Liberty Global Europe Holding B.V., Schiphol-Rijk (NL)

(72) Inventors: Peter Howard Joyce, Hook (GB); Sarah Louise Haggarty, Hook (GB); Richard Mark Dobson, Hook (GB); Adrian John Jolyon Drury, Hook (GB)

(73) Assignee: Liberty Global Europe Holding B.V., Schiphol-Rijk (NL)

( * ) Notice: Subject to any disclaimer, the term of this patent is extended or adjusted under 35 U.S.C. 154(b) by 273 days.

(21) Appl. No.: 16/487,108

(22) PCT Filed: Feb. 22, 2018

(86) PCT No.: PCT/EP2018/054325
§ 371 (c)(1),
(2) Date: Jul. 1, 2020

(87) PCT Pub. No.: WO2018/153946
PCT Pub. Date: Aug. 30, 2018

(65) Prior Publication Data
US 2021/0282026 A1    Sep. 9, 2021

(30) Foreign Application Priority Data
Feb. 22, 2017   (EP) .................................... 17157408

(51) Int. Cl.
*H04W 16/20*    (2009.01)
*H04W 24/10*    (2009.01)
(Continued)

(52) U.S. Cl.
CPC ............ *H04W 16/20* (2013.01); *H04W 16/18* (2013.01); *H04W 24/06* (2013.01); *H04W 24/10* (2013.01)

(58) Field of Classification Search
CPC ..... H04W 16/20; H04W 16/18; H04W 24/08; H04W 84/12
See application file for complete search history.

(56) References Cited

U.S. PATENT DOCUMENTS

| | | |
|---|---|---|
| 2004/0143428 A1 | 7/2004 | Rappaport et al. |
| 2004/0259554 A1 | 12/2004 | Rappaport et al. |

(Continued)

FOREIGN PATENT DOCUMENTS

WO    2008/004955 A2    1/2008

*Primary Examiner* — Nam T Huynh
(74) *Attorney, Agent, or Firm* — N.V. Nederlandsch Octrooibureau; Catherine A. Shultz; Katelyn J. Bernier

(57) ABSTRACT

A method and system for determining deployment parameters of a set of customer premises equipment (CPE) in a housing environment. A housing database (2) and a simulation database (3) connected to a processor (4) are present, the housing database (2) storing housing information, and the simulation database (3) storing simulation data with Wi-Fi performance parameters for a subset of housing types. The processor (4) clusters the stored housing information based on the Wi-Fi performance parameters, associates each of the clustered housing parameter sets with one of the subset of housing types, and for a specific one of the housing types determines deployment parameters based on data obtained from the simulation database (3). The matching of a specific housing environment with one of the subset of housing types allows to quickly and efficiently optimize deployment parameters, such as number, type and placement of CPE.

13 Claims, 1 Drawing Sheet

Figure 1:
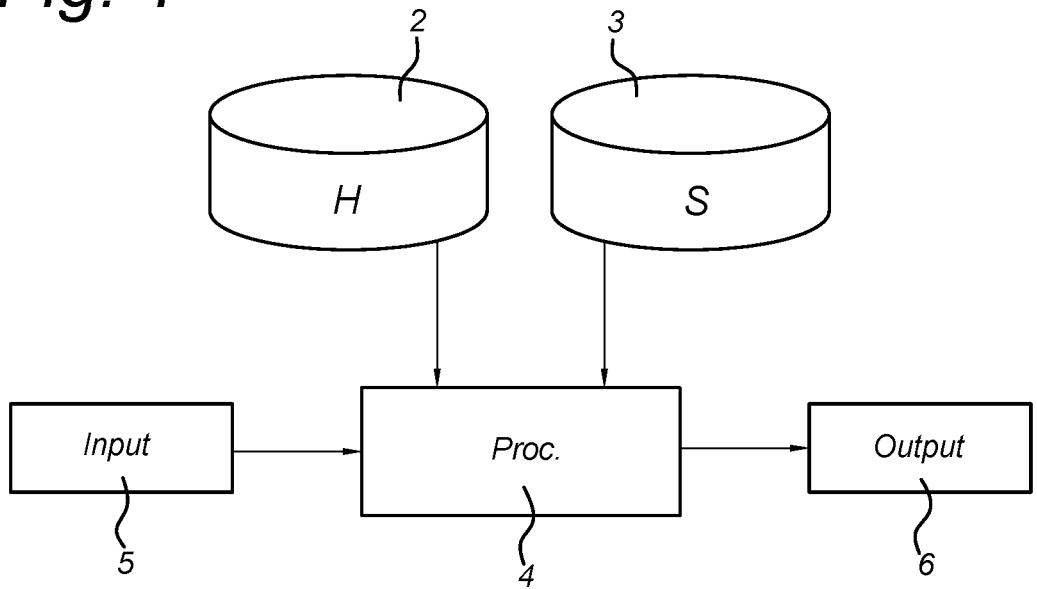

(51) Int. Cl.
*H04W 24/06* (2009.01)
*H04W 16/18* (2009.01)

(56) References Cited

U.S. PATENT DOCUMENTS

| | | |
|---|---|---|
| 2005/0059405 A1 | 3/2005 | Thomson et al. |
| 2005/0233751 A1* | 10/2005 | Bardwell .............. H04W 16/18 |
| | | 455/446 |
| 2011/0032826 A1 | 2/2011 | Kim et al. |

* cited by examiner

METHOD FOR DETERMINING DEPLOYMENT PARAMETERS OF CUSTOMER PREMISES EQUIPMENT

FIELD OF THE INVENTION

The present invention relates to a method for determining deployment parameters of a set of Customer Premises Equipment (CPE) in a housing environment. In further aspects the present invention relates to a system, as well as a computer program product.

BACKGROUND ART

American patent publication US2005/0059405 discloses methods and apparatuses for planning a wireless local area network. Various embodiments receive data such as floor plan data, coverage data, and/or capacity data about a site for the WLAN. Based on such data, features of the WLAN access points can be determined. Examples are the quantity, placement, and/or configuration of the access points.

SUMMARY OF THE INVENTION

The present invention seeks to provide an improved method and system for predicting actual Wi-Fi performance in a specific house, and if necessary, providing advise on how to improve the Wi-Fi performance by providing deployment parameters which will improve the Wi-Fi performance.

According to the present invention, a method as defined above is provided, comprising obtaining a housing database in which housing information is stored, obtaining a simulation database in which simulation data is stored with Wi-Fi performance parameters for a subset of housing types, clustering the stored housing information into clustered housing parameter sets based on the Wi-Fi performance parameters, associating each of the clustered housing parameter sets with one of the subset of housing types, and for a specific one of the housing types determining deployment parameters based on data obtained from the simulation database.

In a further aspect, the present invention relates to a system for determining deployment parameters of a set of customer premises equipment (CPE) in a housing environment, comprising a housing database and a simulation database connected to a processor, the housing database being arranged to store housing information, and the simulation database being arranged to store simulation data with Wi-Fi performance parameters for a subset of housing types. The processor is then arranged for clustering the stored housing information into clustered housing parameter sets based on the Wi-Fi performance parameters, associating each of the clustered housing parameter sets with one of the subset of housing types, and for a specific one of the housing types determining deployment parameters based on data obtained from the simulation database.

Using this present invention method and/or system, it is possible to provide improved deployment parameters for individual housing environments, without using too many resources such as input data gathering and processing resources. This allows to further optimize client guidance and information on using a set of CPE in a housing environment, and in further embodiments also allows to gather relevant data from CPE at client's housing environments for network planning purposes.

SHORT DESCRIPTION OF DRAWINGS

Figure 2:
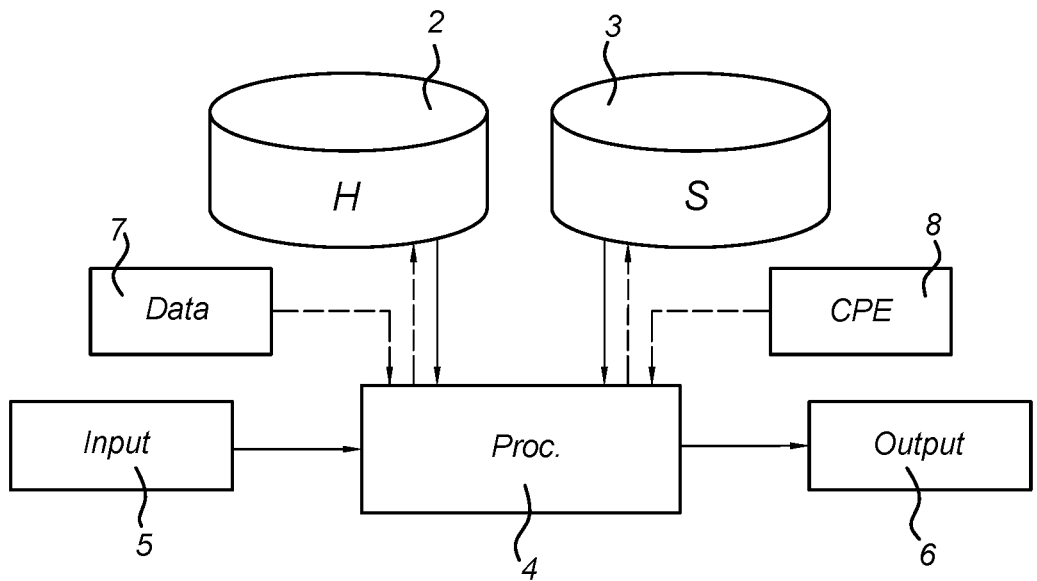

The present invention will be discussed in more detail below, with reference to the attached drawings, in which FIG. 1 shows a schematic simplified diagram implementing a method for determining deployment parameters in a first embodiment of the present invention;

FIG. 2 shows a schematic diagram of a further implementation embodiment of the present invention, including input data enhancement and CPE measurement feedback.

DESCRIPTION OF EMBODIMENTS

The present invention relates to a method and system for predicting Wi-Fi performance of a set of (individual) customer premises equipment (CPE) in operation, e.g. as provided to clients by multimedia and internet service providers. The set of CPE often comprise a modem combined with an access point (AP) providing Wi-Fi communications to (mobile) devices in the customer's home such as laptops, smart phones, media receivers (TV, streaming audio/video receivers, etc.). The predicted Wi-Fi performance can then be used for determining which type and number of CPEs are to be used, which operational parameters need to be pre-set or configured, and/or if additional devices (such as Wi-Fi repeaters) are needed for optimal Wi-Fi performance in a specific house. The present invention embodiments can then be used to provide deployment parameters of a set of customer premises equipment (CPE) in a housing environment, wherein the deployment parameters relate at least to the number, type and placement of CPE prescribed for that specific housing environment.

Furthermore, the present invention method and system embodiments relate to using installed and operative CPE as a feedback source to enhance the operation and efficiency of a network of the service provider, e.g. by using feedback data in a network planning tool.

FIG. 1 shows a schematic simplified diagram of main components of a system allowing to implement a method for determining deployment parameters. It comprises two databases which are a housing database 2 (denoted H) and a simulation database 3 (denoted S). In the housing database 2, housing information such as survey data, size, type, age, construction material, relative positioning to neighbouring houses used, etc. are stored for a plurality of houses. In the simulation database 3 simulation data is stored with Wi-Fi performance parameters for a subset of housing types. A processor 4 is arranged to obtain information from both the housing database 2 and simulation database 3, together with input parameters 5. A calculation is then executed by the processor 4 in order to obtain a suitable set of output (deployment) parameters 6.

The processor 4 is arranged to execute a present invention method embodiment, which in a first embodiment is a method for determining deployment parameters of customer premises equipment (CPE) in a housing environment. The deployment parameters may include, but are not limited to the number, type and placement of CPE prescribed for that specific housing environment. The method comprises obtaining a housing database 2 in which housing information is stored. Housing information is e.g. survey data for a large number of houses, and comprises parameter data related to one or more of: size, type, age, construction material used, dimensions such as height, relative position to neighbouring houses, shape of house, geolocation, number of bedrooms, etc. The method further comprises obtaining a simulation database 3 in which simulation data is stored with Wi-Fi performance parameters for a subset of housing types. The simulation data e.g. comprise ray tracing data of Wi-Fi signals, or actual measurement data of Wi-Fi signals. The simulation data may further comprise radio frequency attenuation data, physical data rate data, etc. Furthermore, the method comprises clustering the stored housing information into clustered housing parameter sets based on the Wi-Fi performance parameters. Finally, the method then associates each of the clustered housing parameter sets with one of the subset of housing types. For a specific one of the housing types (and optionally also based on a usage profile that may be derived for the inhabitants of that house, e.g. received as a request in the form of input data 5) the method then determines deployment parameters based on data obtained from the simulation database 3. The input data as mentioned above, may also specify a specific house in combination with additional parameters, such as usage profile, which further would allow to match the specific house (and usage profile) to one of the housing types. This will provide deployment parameters as output data 6 which are best matched to the usage profile and a specific type of house.

In a further aspect, the present invention thus relates to a system for determining deployment parameters of a set of customer premises equipment (CPE) in a housing environment, comprising a housing database 2 and a simulation database 3 connected to a processor 4. The housing database 2 is arranged to store housing information, and the simulation database 3 is arranged to store simulation data with Wi-Fi performance parameters for a subset of housing types. The processor 4 is arranged for clustering the stored housing information into clustered housing parameter sets based on the Wi-Fi performance parameters, associating each of the clustered housing parameter sets with one of the subset of housing types, and for a specific one of the housing types determining deployment parameters based on data obtained from the simulation database 3.

The processes executed by the processor 4 as described above, are e.g. implemented in a Machine Learning implementation of processor 4, e.g. for managing the housing database 2. The Machine Learning (ML) implementation uses e.g. Python scripting but the logic can be applied using other coding languages as well.

The processor 4 takes input from free or commercially available sources of housing information depending on the country for storage in the housing database 2. For example in The Netherlands a Kadaster database may be used and in UK Ordnance Survey data and CACI data could be used. The ML implementation allows for (customer entered) data to be added to enhance the housing information in housing database 2. Such enhancing data might be number of floors in a home, or recent building changes. Other examples of enhanced data may be number and age of inhabitants, number and type of available end user devices or applications, i.e. a usage profile. The ML implementation in the processor 4 clusters the housing information in housing database 2 based on parameters that are relevant to Wi-Fi performance and associates every house in the housing database 2 with its closest matching simulated home of the subset of housing environments in the simulation database 3. The simulated subset of housing environments may have multiple simulations for different CPE & different positioning of CPE. These multiple simulations are analysed against given parameters (such as usage profile, services provided by the ISP, customer's willingness to pay for additional CPE) and would provide different levels of service in order to determine the optimal CPE configuration and placement, i.e. the deployment parameters. The ML implementation in the processor 4 can export data (as output data 6) to e.g. be integrated into customer facing tools, or to e.g. provide aggregated reporting of Wi-Fi metrics or CPE deployments.

The ML implementation accuracy of clustering and prediction can be further enhanced when real world Wi-Fi data from CPE in actual operation in various housing environments is imported into the ML implementation to provide further multiple calibration sources. Interpretation and normalisation of simulated and real world data will be critical to the efficacy of the model. This will be discussed in more detail with reference to FIG. 2 below.

In order to fill the simulation database 3, several methods may be used to predict the Wi-Fi performance data to be stored in the simulation database 3 for the subset of housing types, i.e. a sample number of homes which are pre-selected. For these pre-selected homes, specialised measurements are done of the homes. One option can be to deploy an architectural surveyor who will measure the dimensions of the home and make an assessment of the building materials used in the homes construction. The architectural surveyor can also provide a three-dimensional (3D) digital model of the home, with the surfaces of the model representing walls, floors etc., digitally annotated with the construction material used. These parameters can then be used with further information, such as the estimated electromagnetic properties of construction materials (transmission, diffraction, reflection loss etc.) and radio frequencies of interest, to calculate relevant simulation data in the form of path loss calculations to be stored in the simulation database 3 and used for further calculation. The Wi-Fi performance parameters may additionally or alternatively include characterisation data of the possible CPE to be deployed, such as antenna radiation patterns, radio frequency power, etc.

This can be used for providing actual path loss data and further Wi-Fi performance data for a specific housing type (home environment) and (set of) CPE. The 3D digital model of the home will be validated by comparing to photographs of the home and may be ingested into a Ray Tracing Tool (RTT) (e.g. a software program being executed on a computer). Some of the data ingest, parameter configuration and data extraction of the RTT are automated. The actual antenna parameters for the CPE can be imported, as separately measured by third party test houses. Using the RTT, also the influence of the use of increased or reduced radio frequency power, the criticality of CPE placement may be included in the simulation data.

Additionally, or alternatively, another method can be to deploy an RF testing company to visit the selected home to make Wi-Fi measurements within the home, to a designed test plan, for a known type of CPE being in operation. It is noted that this manner of simulation data gathering is high in consuming time and other resources. In an even further alternative embodiment, this method is used for validation of the simulation data stored in simulation database 2. In a specific embodiment, the simulation obtained can be calibrated through comparison of the RF testing data to the simulated Ray Tracing data.

Through an automated scripting, it is possible to evolve a 'what if' series of simulations to show the different effects of Wi-Fi parameters that could be deployed across the customer base, such as increased number of spatial streams and/or antennae, number of CPE devices, changes in transmission power, receive sensitivities, radio frequency, channel bandwidth, antenna patterns, nearby interference etc.

In an even further embodiment, a Communication Model (CM) is envisaged to take the wireless propagation provided by the RTT and overlay the performance associated with 802.11 and also the effect of noise, in order to provide even better quality simulation data to be stored in the simulator database 3. In addition, a Network Model (NM) is envisaged to take the multiple Wi-Fi links simulated by the RTT and the CM and overlay a multi-client, multi-access point environment to simulate the real use of Wi-Fi in a specific housing environment. The number of clients and access points would be simulated for different customer demographics.

Using the housing database 2, in combination with the simulation data stored in simulation database 3 for a subset of housing types, the processor 4 is now able to predict Wi-Fi performance for a specific housing environment (with specific types of CPE) as input data 5, by matching the input data 5 with the information stored in housing database 2 and simulation database 3, without actually having to perform complex calculations for that specific housing environment. Only one of the subset of housing types which most closely matches the specific housing environment in the input data 5, is used to obtain the Wi-Fi performance parameters from the simulation database 3.

FIG. 2 shows a schematic simplified diagram of main components of a system allowing to implement a further method for determining configuration parameters. Like elements with similar functions as the diagram shown in FIG. 1 are indicated by the same reference numeral. In addition to the diagram elements in FIG. 1, further input and feedback paths are provided, in order to enhance the data stored in the housing database 2 and/or simulation database 3. The additional paths are marked with dashed lines.

In one of the embodiments of the present invention, the method further comprises enhancing the stored housing information, based on CPE user or service provider input data. In an even further embodiment, the housing data comprising one or more of the group of: survey data, size, type, age, construction material, dimensions such as height, relative position to neighbouring houses, shape of house, geolocation, number of bedrooms.

Additional input data (indicated as provided to processor 4 via an additional input data device 7) is input and processed by the processor 4 for storage of enhanced housing data in housing database 2. Examples of additional input data include, but are not limited to, the number of floors and/or rooms in a specific one of the housing environments, the number and age of inhabitants. In a further embodiment, determining deployment parameters is executed using additional usage data as input, such as, the (future) number and types of end user devices/applications available. This data is e.g. not available from public (survey) data, and may originate from other sources, such as the actual customer living in that specific housing environment, or the from the service provider which e.g. has collected demographic data from its own subscriber database. The additional input data as stored in the housing database 2 may be used by the present invention method in order to enhance the matching process of a specific housing environment.

As shown in the FIG. 2 embodiment, the present invention system embodiment may further comprise an additional input data device 7 connected to the processor 4, the processor 4 being further arranged for enhancing the stored housing information, based on CPE user or service provider input data received from the additional input data device 7.

In an even further embodiment of the present invention, the method further comprises receiving measurement data from an installed CPE, and enhancing the simulation data of the associated one of the subset of housing types in the simulation database 3. CPE may be configured to make specific measurements of relevant Wi-Fi related parameters, when in operation in a housing environment, and the network of the service provided may be adapted to obtain such data from a large number of installed CPE (e.g. periodically). The data received from an installed CPE is indicated as data received by processor 4 from a CPE data input device 8, which data is input to the processor 4 for enhancing the simulation data stored in the simulation database 3. In addition, or alternatively, data from the CPE data input device 8 is used by the processor 4 to provide further calculations, e.g. in the field of network planning for the service provider.

For the corresponding system embodiment, the system thus further comprises a CPE data input device 8 connected to the processor 4, the processor 4 being further arranged for receiving measurement data from an installed CPE via the CPE data input device 8, and for enhancing the simulation data of the associated one of the subset of housing types in the simulation database.

According to the present invention embodiments, service providers have direct customer relationships to known customer home environments coupled with insight into the actual Wi-Fi parameters, as returned by the CPE. In a network operating environment, the model described above in relation to the housing database 2, simulation database 3 and the matching implementation may be used to provide Wi-Fi estimation and hence expectation setting at various points of the customer life-cycle. In this further embodiment, determining deployment parameters is executed by checking whether a minimum desired level of service is obtainable, e.g. a minimum up/down data rate, minimal signal strength, maximum packet error rate, etc.

Aspects of the present invention embodiments may be implemented with a general or distributed computer system operating environment. In a distributed computing environment, tasks may be performed by remote computer devices that are linked through communications networks. The distributed computing environment may include client and server devices that may communicate either locally or via one or more computer networks. Embodiments of the present invention processor 4 may comprise special purpose and/or general purpose computer devices that each may include standard computer hardware such as a central processing unit (CPU) or other processing means for executing computer executable instructions, computer readable media for storing executable instructions, a display or other output means for displaying or outputting information, a keyboard or other input means for inputting information, and so forth. Examples of suitable computer devices include hand-held devices, multiprocessor systems, microprocessor-based or programmable consumer electronics, networked PCs, minicomputers, mainframe computers, and the like.

The invention embodiments have been described above as functional method steps which may be implemented in the general context of computer-executable instructions, such as program modules, that are executed by a processing device, including, but not limited to a personal computer. Generally, program modules include routines, programs, objects, components, data structure definitions and instances, etc., that perform particular tasks or Implement particular abstract data types. Typically the functionality of the program modules may be combined or distributed as desired in various environments.

Embodiments within the scope of the present invention also include computer readable media having executable instructions. Such computer readable media can be any available media that can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

In a specific further aspect of the present invention, a computer program product is provided, comprising computer readable instructions, which, when loaded on a processor system, allow the processor system to execute the present invention method embodiments as described above.

The present invention has been described above with reference to a number of exemplary embodiments as shown in the drawings. Modifications and alternative implementations of some parts or elements are possible, and are included in the scope of protection as defined in the appended claims.

The invention claimed is:

1. A method for determining deployment parameters of a set of customer premises equipment (CPE) in a housing environment, comprising:
   obtaining a housing database in which housing information is stored;
   obtaining a simulation database in which simulation data is stored with Wi-Fi performance parameters for a subset of housing types;
   clustering the stored housing information into clustered housing parameter sets based on the Wi-Fi performance parameters;
   associating each of the clustered housing parameter sets with one of the subset of housing types; and
   for a specific one of the housing types determining the deployment parameters based on data obtained from the simulation database.

2. The method according to claim 1, further comprising enhancing the stored housing information, based on CPE user or service provider input data.

3. The method according to claim 1, further comprising receiving measurement data from an installed CPE, and enhancing the simulation data of the associated one of the subset of housing types in the simulation database.

4. The method according to claim 1, wherein determining deployment parameters is executed using additional usage data as input.

5. The method according to claim 1, wherein determining deployment parameters is executed by checking whether a minimum desired level of service is obtainable.

6. The method according to claim 1, further comprising storing housing information data in the housing database, the housing data comprising one or more of the group of:
   survey data, size, type, age, construction material, dimensions, relative position to neighbouring houses, shape of house, geolocation, number of bedrooms.

7. The method according to claim 1, further comprising storing simulation data in the simulation database, wherein the simulation data comprises one or more from the group of: ray tracing data of Wi-Fi signals, actual measurement data of Wi-Fi signals, radio frequency attenuation data, physical data rate data.

8. The method according to claim 1, wherein the Wi-Fi performance parameters comprise one or more of the group of:
   increased number of spatial streams and/or antennae, number of CPE devices, changes in transmission power, receive sensitivities, radio frequency, channel bandwidth, antenna patterns, nearby interference.

9. A system for determining deployment parameters of a set of customer premises equipment (CPE) in a housing environment, comprising
   a housing database and a simulation database connected to a processor,
   the housing database being arranged to store housing information, and the simulation database being arranged to store simulation data with Wi-Fi performance parameters for a subset of housing types, and
   wherein the processor is arranged for clustering the stored housing information into clustered housing parameter sets based on the Wi-Fi performance parameters, associating each of the clustered housing parameter sets with one of the subset of housing types, and for a specific one of the housing types determining deployment parameters based on data obtained from the simulation database.

10. The system of claim 9, further comprising an additional input data device connected to the processor, the processor being further arranged for enhancing the stored housing information, based on CPE user or service provider input data received from the additional input data device.

11. The system according to claim 9 or 10, further comprising a CPE data input device connected to the processor, the processor being further arranged for receiving measurement data from an installed CPE via the CPE data input device, and enhancing the simulation data of the associated one of the subset of housing types in the simulation database.

12. The system according to claim 9, wherein the processor is further arranged to execute a method comprising:
   obtaining a housing database in which housing information is stored;
   obtaining a simulation database in which simulation data is stored with Wi-Fi performance parameters for a subset of housing types;
   clustering the stored housing information into clustered housing parameter sets based on the Wi-Fi performance parameters;
   associating each of the clustered housing parameter sets with one of the subset of housing types; and
   for a specific one of the housing types determining the deployment parameters based on data obtained from the simulation database.

13. A non-transitory computer program product, comprising computer readable instructions, which, when loaded on a processor system, allow the processor system to execute the method according to claim 1.

* * * * *